United States Patent
Shin et al.

(10) Patent No.: US 11,412,907 B2
(45) Date of Patent: Aug. 16, 2022

(54) CLEANER AND CONTROLLING METHOD THEREOF

(71) Applicant: LG ELECTRONICS INC., Seoul (KR)

(72) Inventors: Yongmin Shin, Seoul (KR); Ilsoo Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 509 days.

(21) Appl. No.: 15/991,655

(22) Filed: May 29, 2018

(65) Prior Publication Data

US 2018/0338661 A1    Nov. 29, 2018

(30) Foreign Application Priority Data

May 29, 2017    (KR) .................. 10-2017-0066355

(51) Int. Cl.
*A47L 11/40* (2006.01)
*A47L 9/28* (2006.01)
(Continued)

(52) U.S. Cl.
CPC ........... *A47L 11/4061* (2013.01); *A47L 9/009* (2013.01); *A47L 9/2805* (2013.01); *A47L 9/2857* (2013.01);
(Continued)

(58) Field of Classification Search
CPC .. A47L 11/4061; A47L 11/4066; A47L 9/009; A47L 9/2805; A47L 9/2857;
(Continued)

(56) References Cited

U.S. PATENT DOCUMENTS

2002/0060542 A1* 5/2002 Song .................... G05D 1/0246
  318/568.12
2006/0170773 A1* 8/2006 Rye .................. G08B 13/19645
  348/159
(Continued)

FOREIGN PATENT DOCUMENTS

EP     2 764 812       8/2014
JP     2005-304540     11/2005
(Continued)

OTHER PUBLICATIONS

Korean Office Action dated Jun. 19, 2018 issued in Application No. 10-2017-0066355.
(Continued)

*Primary Examiner* — Joseph G Ustaris
*Assistant Examiner* — Jimmy S Lee
(74) *Attorney, Agent, or Firm* — KED & Associates, LLP

(57) ABSTRACT

A cleaner performing autonomous traveling includes a main body, first and second cameras photographing the periphery of the main body, and a controller controlling the first and second cameras to capture an image according to preset order, wherein a direction in which the first camera is directed and a direction in which the second camera is directed form a predetermined angle, and the controller generates three-dimensional (3D) coordinate information related to an object located near the main body using images obtained in the first and second cameras.

12 Claims, 5 Drawing Sheets

(51) Int. Cl.
*A47L 9/00* (2006.01)
*G01B 11/02* (2006.01)
*G01B 11/25* (2006.01)
*G01B 11/245* (2006.01)

(52) U.S. Cl.
CPC ......... *A47L 9/2894* (2013.01); *A47L 11/4066* (2013.01); *G01B 11/026* (2013.01); *G01B 11/245* (2013.01); *G01B 11/2513* (2013.01); *A47L 2201/04* (2013.01); *A47L 2201/06* (2013.01)

(58) Field of Classification Search
CPC .............. A47L 9/2894; A47L 2201/04; A47L 2201/06; G01B 11/026; G01B 11/245; G01B 11/2513
USPC ....................................................... 348/139
See application file for complete search history.

(56) References Cited

U.S. PATENT DOCUMENTS

| | | | |
|---|---|---|---|
| 2011/0058053 A1* | 3/2011 | Roh | H04N 5/23232 348/218.1 |
| 2013/0204483 A1 | 8/2013 | Sung et al. | |
| 2014/0254880 A1* | 9/2014 | Srinivasan | G06K 9/00335 382/106 |
| 2015/0323308 A1* | 11/2015 | Tsujii | G01B 11/002 356/614 |
| 2015/0350572 A1* | 12/2015 | Hattori | H04N 5/332 250/332 |
| 2015/0373322 A1* | 12/2015 | Goma et al. | G01S 17/10 348/21 |
| 2016/0143500 A1 | 5/2016 | Fong et al. | |
| 2016/0209206 A1* | 7/2016 | Yu | G01B 11/2513 |
| 2017/0323455 A1* | 11/2017 | Bittan | G06K 9/209 |
| 2017/0343338 A1* | 11/2017 | Hamaguchi | G01B 11/2513 |
| 2018/0176544 A1* | 6/2018 | Wang | H04N 7/181 |
| 2018/0296049 A1* | 10/2018 | Izawa | A47L 9/0472 |

FOREIGN PATENT DOCUMENTS

| | | |
|---|---|---|
| KR | 10-2014-0145648 | 12/2014 |
| KR | 10-1490055 | 2/2015 |
| KR | 10-2015-0124011 | 11/2015 |
| KR | 10-1578884 | 12/2015 |
| KR | 10-1660703 | 9/2016 |
| KR | 10-2017-0057840 | 5/2017 |

OTHER PUBLICATIONS

Korean Notice of Allowance dated Dec. 20, 2018 issued in Application No. 10-2017-0066355.

* cited by examiner

CLEANER AND CONTROLLING METHOD THEREOF

CROSS-REFERENCE TO RELATED APPLICATION

Pursuant to 35 U.S.C. § 119(a), this application claims the benefit of earlier filing date and right of priority to Korean Application No. 10-2017-0066355, filed on May 29, 2017, the contents of which is incorporated by reference herein in its entirety.

BACKGROUND OF THE DISCLOSURE

1. Field of the Disclosure

The present invention relates to a cleaner and a controlling method thereof, and particularly, to a cleaner capable of recognizing an obstacle and performing autonomous traveling, and a controlling method thereof.

2. Background of the Disclosure

Generally, a robot has been developed for an industrial purpose and has been in charge of part of factory automation. Recently, robot-applied fields have further extended to develop medical robots or aerospace robots, and home robots that may be used in general houses have also been made.

A typical example of home robots is a robot cleaner, which is a sort of a home appliance for performing cleaning by sucking ambient dust or foreign objects, while traveling in a predetermined area. Such a robot cleaner includes a generally rechargeable battery and has an obstacle sensor capable of avoiding an obstacle during traveling so that the robot cleaner may perform cleaning, while traveling.

Recently, beyond performing cleaning while robot cleaners are simply autonomously traveling in a cleaning area, research into utilization of robot cleaners in various fields such as healthcare, smart home, remote control, and the like, has been actively conducted.

When the robot cleaner performs autonomous traveling in a cleaning area, the robot cleaner may meet various obstacles existing in the cleaning area, and thus, in order for the robot cleaner to avoid such obstacles during autonomous traveling or cleaning operation, an apparatus or method for detecting information related to the obstacles.

Specifically, a conventional robot cleaner includes only an infrared sensor, an ultrasonic sensor, a radio frequency sensor, an optical sensor, or a camera sensor for acquiring a two-dimensional image in order to detect information related to an obstacle. Therefore, it is difficult to obtain accurate obstacle information in the conventional robot cleaner.

In particular, the conventional robot cleaner generally detects an obstacle by using two-dimensional image information obtained by a two-dimensional camera sensor. In this case, a distance between the obstacle and the robot main body and a three-dimensional shape of the obstacle cannot be accurately detected only with the two-dimensional image information.

Therefore, the conventional robot cleaner has a problem of correcting the traveling route in order to avoid an obstacle even through there is an obstacle that the robot cleaner may pass on a traveling route.

In addition, the conventional robot cleaner extracts feature points from two-dimensional image information to detect obstacle information. When the two-dimensional image information is formed such that feature point extraction is difficult, accuracy of the detected obstacle information is significantly degraded.

In order to solve such a problem, there is a need for a robot cleaner equipped with a three-dimensional (3D) camera sensor.

As a related art, according to Korean registered Patent No. 10-1490055 (patent registration date, Jan. 29, 2015), an obstacle map is generated using a three-dimensional map of an RGB-D camera.

However, since a viewing angle of the 3D camera sensor is narrower than that of a 2D camera sensor, there arises a problem that an area in which the robot cleaner using the 3D camera sensor acquires the obstacle information at a certain point is somewhat limited.

Also, since the 3D camera sensor acquires a larger amount of data than the 2D camera sensor, the amount of computation of the robot cleaner using the 3D camera sensor may excessively increase.

When the amount of computation of the robot cleaner is excessively increased, it takes a long time to detect obstacle information and determine a traveling algorithm corresponding to the obstacle information, so that it is difficult to immediately react to the surrounding obstacle.

In addition, the conventional cleaner using the RGB-D camera has a problem in that it cannot sufficiently acquire 3D coordinate information related to an object around a main body in a dark area.

SUMMARY OF THE DISCLOSURE

Therefore, an aspect of the detailed description is to provide a cleaner which performs autonomous traveling to recognize a location of a robot or perform obstacle avoidance traveling using a three-dimensional (3D) camera sensor for acquiring three-dimensional coordinate information related to topography around a moving robot or a robot cleaner or an obstacle located nearby, and a controlling method thereof.

Another aspect of the detailed description is to provide a cleaner which performs autonomous traveling, capable of detecting an obstacle, recognizing a location, and performing various functions required for a cleaner by using only a single set of sensor modules for obtaining three-dimensional information, and a controlling method thereof.

Still another aspect of the detailed description is to provide a cleaner which performs autonomous traveling, capable of sufficiently obtaining three-dimensional information required for safe traveling even in a dark environment, and a controlling method thereof.

Yet another aspect of the detailed description is to provide a cleaner which performs autonomous traveling, capable of immediately responding to an obstacle by reducing the amount of computation during a process of detecting information related to the obstacle existing in a traveling path using three-dimensional coordinate information obtained from a three-dimensional camera sensor.

To achieve these and other advantages and in accordance with the purpose of this specification, as embodied and broadly described herein, a cleaner performing autonomous traveling includes: a main body; first and second cameras photographing the periphery of the main body; and a controller controlling the first and second cameras to capture an image according to preset order, wherein a direction in which the first camera is directed and a direction in which the second camera is directed form a predetermined angle, and the controller generates three-dimensional (3D) coordinate information related to an object located near the main body using images obtained in the first and second cameras.

In an embodiment, the cleaner may further include: an infrared projector, wherein the controller may change an output of the infrared projector.

In an embodiment, the controller may increase the output of the infrared projector in order to increase a target distance of the first and second cameras.

In an embodiment, the controller may repeatedly change the output value of the infrared projected to a first value and a second value.

In an embodiment, the infrared projector may emit an infrared signal of a predetermined pattern.

In an embodiment, the camera may perform a first step of turning on the first camera; a second step of setting the output of the infrared projector to the first value; a third step of obtaining information related to an object existing within a first distance range from the main body by using the first camera; and a fourth step of turning off the first camera.

In an embodiment, the controller may perform: a fifth step of turning on the second camera after the first camera is turned off in the fourth step; a sixth step of obtaining information related to the object existing within the first distance range from the main body by using the second camera; and a seventh step of turning off the second camera.

In an embodiment, the controller may perform a seventh step of turning on the first camera; a ninth step of setting the output of the infrared projector to a second value higher than the first value; a tenth step of obtaining information related to an object existing within a second distance range, out of the first distance range, from the main body using the first camera; and an eleventh step of turning off the first camera.

In an embodiment, the controller may perform a twelfth step of turning on the second camera after the first camera is turned off in the eleventh step; a thirteenth step of obtaining information related to an object existing within the second distance range from the main body using the second camera; and a fourteenth step of turning off the second camera.

In an embodiment, the controller may sequentially repeatedly perform the first to fourteenth steps.

In an embodiment, when the output value of the infrared projector is the first value, the controller may detect information related to an obstacle existing around the main body, by using the information obtained by the first and second cameras.

In an embodiment, when the output value of the infrared projector is the second value greater than the first value, the controller may detect information related to a position of the main body, by using the information obtained by the first and second cameras.

In an embodiment, the first and second cameras may be red, green blue distance (RGBD) cameras.

In an embodiment, the first and second cameras may be depth cameras.

To achieve these and other advantages and in accordance with the purpose of this specification, as embodied and broadly described herein, a method for controlling a cleaner including first and second cameras directed in different directions and an infrared projector and performing autonomous traveling, includes: alternately driving the first and second cameras; changing an output of the infrared projector to correspond to an ON or OFF time point of the first and second cameras; and generating three-dimensional (3D) coordinate information related to an object located around the main body using images alternately obtained in the first and second cameras.

In an embodiment, the alternatively driving of the first and second cameras may include: a short-distance photographing step of alternately driving the first and second cameras in a state that the output of the infrared projector is set to a first value and a long-distance photographing step of alternately driving the first and second cameras in a state that the output of the projector is set to a second value larger than the first value.

In an embodiment, the method may further include: detecting information related to an obstacle existing around the main body based on the 3D coordinate information generated in the short-distance photographing step.

In an embodiment, the method may further include: detecting information related to a position of the main body based on the 3D coordinate information generated in the short-distance photographing step.

In an embodiment, the short-distance photographing step and the long-distance photographing step may be sequentially repeatedly performed.

According to the present invention, it is possible to replace other sensors required for obstacle detection or position recognition by using only one sensor module for acquiring three-dimensional coordinate information related to an object around the main body.

Further, according to the present invention, obstacle detection and position recognition can be accurately performed even in a dark environment by using two depth cameras and adjusting an output of an infrared projector.

In addition, according to the present invention, since the cleaner which performs autonomous traveling can quickly process three-dimensional coordinate information while maintaining performance of the controller, it is possible to prevent an increase in manufacturing cost.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Hereinafter, embodiments of the present invention will be described in detail with reference to the accompanying drawings. The technical terms used in the present specification are set forth to mention specific embodiments of the present invention, and do not intend to define the scope of the present invention.

Figure 1:
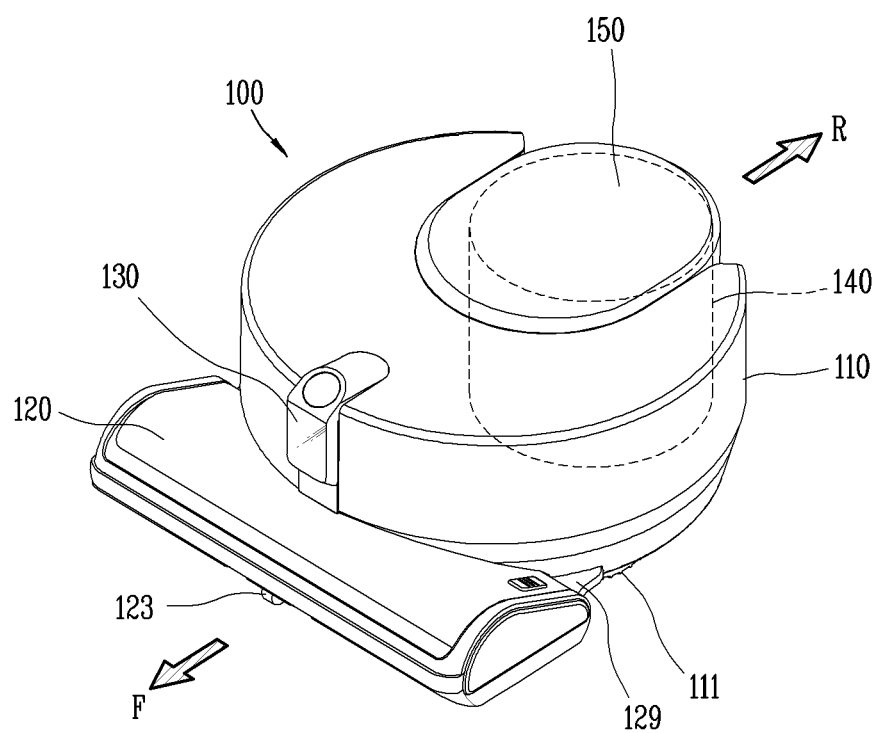
FIG. 1 is a perspective view illustrating an example of a cleaner according to the present invention.
Figure 2:
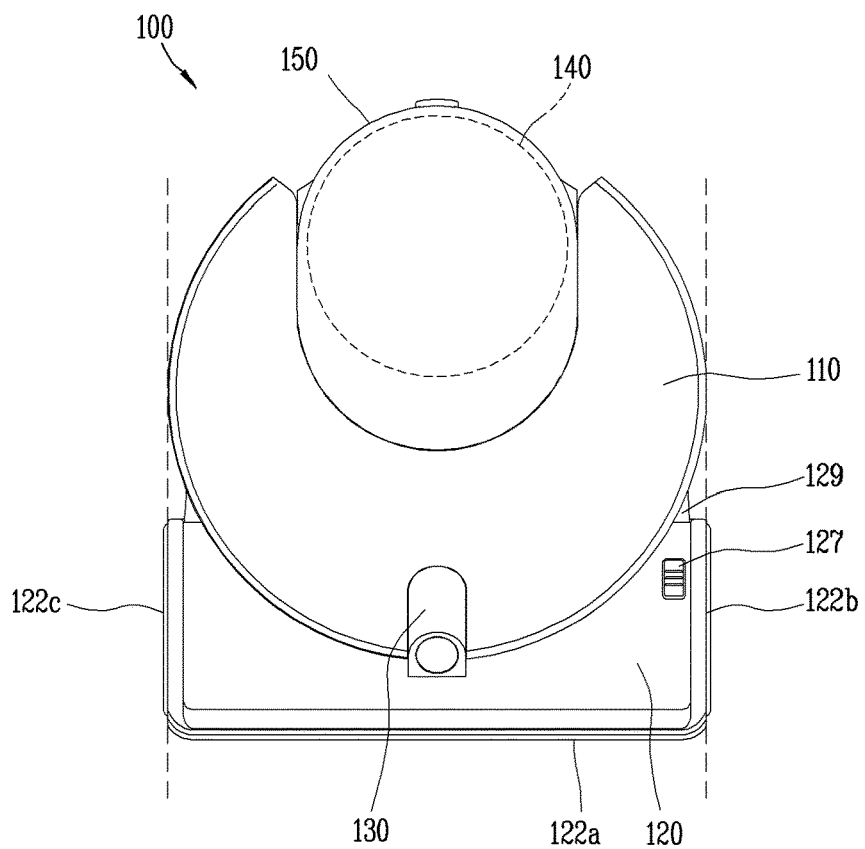
FIG. 2 is a plan view of the cleaner illustrated in FIG. 1.
Figure 3:
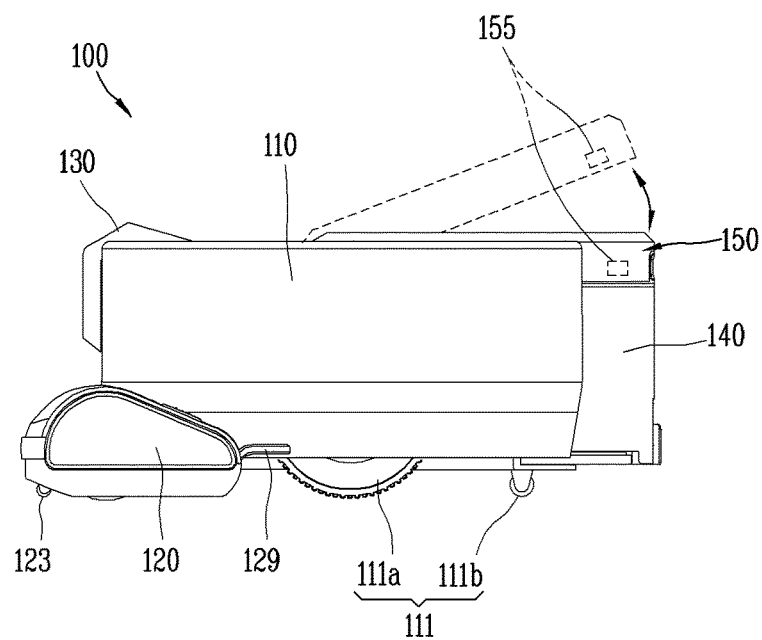
FIG. 3 is a side view of the cleaner illustrated in FIG. 1.

FIG. 1 is a perspective view illustrating an example of a robot cleaner 100 according to the present invention, FIG. 2 is a plan view of the robot cleaner 100 illustrated in FIG. 1, and FIG. 3 is a side view of the robot cleaner 100 illustrated in FIG. 1.

For reference, in this disclosure, a moving robot, a robot cleaner, and a cleaner performing autonomous traveling may be used to have the same meaning.

Referring to FIGS. 1 to 3, the robot cleaner 100 performs a function of cleaning a floor, while traveling a predetermined area by itself. Here, cleaning the floor includes sucking dust (including a foreign material) of the floor and wiping the floor.

The robot cleaner 100 includes a cleaner main body 110, a suction unit 120, a sensing unit 130, and a dust box 140.

A controller (not shown) for controlling the robot cleaner 100 and a wheel unit 111 for causing the robot cleaner 100 to travel are provided in the cleaner main body 110. The robot cleaner 100 may be moved or rotated in every direction by the wheel unit 111.

The wheel unit 111 includes a main wheel 111a and a sub-wheel 111b.

The main wheel 111a is provided on both sides of the cleaner main body 110 and is rotatable in one direction or in the other direction according to a control signal from the controller. Each main wheel 111a may be configured to be driven mutually independently. For example, each main wheel 111a may be driven by different motors.

The sub-wheel 111b supports the cleaner main body 110 with the main wheel 111a and assists traveling of the robot cleaner 100 by the main wheel 111a. The sub-wheel 111b may also be provided in the suction unit 120 described hereinafter.

As described above, as the controller controls driving of the wheel unit 111, the robot cleaner 100 may autonomously travel on the floor.

Meanwhile, a battery (not shown) supplying power to the robot cleaner 100 is installed in the cleaner main body 110. The battery may be rechargeable and may be detachably provided on a bottom surface part of the cleaner main body 110.

The suction unit 120 is disposed to protrude from one side of the cleaner main body 110 and suck air including dust. The one side may be a side in which the cleaner main body 110 travels in a forward direction (F), that is, a front side of the cleaner main body 110.

In this drawing, it is illustrated that the suction unit 120 protrudes from one side of the cleaner main body 110 to the front side and to the left and right sides. In detail, a front end portion of the suction unit 120 is disposed in a position spaced apart from one side of the cleaner main body 110 forwards, and left and right end portions of the suction unit 120 are disposed in positions spaced apart from one side of the cleaner main body 110 leftwards and rightwards.

As the cleaner main body 110 has a circular shape and both sides of a rear end portion of the suction unit 120 protrude to both left and right sides of the cleaner main body 110, an empty space, i.e., a gap, may be formed between the cleaner main body 110 and the suction unit 120. The empty space may be a space between left and right end portions of the cleaner main body 110 and left and right end portions of the suction unit 120, and has a shape recessed to an inner side of the robot cleaner 100.

If an obstacle is caught in the empty space, the robot cleaner 100 may be caught by the obstacle and cannot move. In order to prevent this, the cover member 129 may be disposed to cover at least a portion of the empty space. The cover member 129 may be provided in the cleaner main body 110 or the suction unit 120. In this embodiment, the cover member 129 protrudes from both sides of a rear end portion of the suction unit 120 and covers an outer circumferential surface of the cleaner main body 110.

The cover member 129 is disposed to fill the empty space, i.e., at least a portion of the empty space between the cleaner main body 110 and the suction unit 120. Thus, an obstacle is prevented from being caught in the empty space, or although an obstacle is caught in the empty space, the robot cleaner may be easily released from the obstacle.

The cover member 129 protruding from the suction unit 120 may be supported by an outer circumferential surface of the cleaner main body 110. When the cover member 129 protrudes from the cleaner main body 110, the cover member 129 may be supported by a rear surface portion of the suction unit 120. According to the structure, when the suction unit 120 collides with an obstacle, a partial amount of the impact may be transmitted to the cleaner main body 110 such that the impact is distributed.

The suction unit 120 may be detachably coupled to the cleaner main body 110. When the suction unit 120 is separated from the cleaner main body 110, a cloth module (not shown) may be detachably coupled to the cleaner main body 110. Thus, when the user wants to remove dust from a floor, the user may attach the suction unit 120 to the cleaner main body 110, and when the user wants to wipe the floor, the user may attach the cloth module to the cleaner main body 110.

When the suction unit 120 is mounted in the cleaner main body 110, mounting of the suction unit 120 may be guided by the aforementioned cover member 129. That is, since the cover member 129 is disposed to cover an outer circumferential surface of the cleaner main body 110, a relative position of the suction unit 120 with respect to the cleaner main body 110 may be determined.

The sensing unit 130 is disposed in the cleaner main body 110. As illustrated, the sensing unit 130 may be disposed on one side of the cleaner main body 110 where the suction unit 120 is positioned, i.e., on the front side of the cleaner main body 110.

The sensing unit 130 may be disposed to overlap the suction unit 120 in a vertical direction of the cleaner main body 110. The sensing unit 130 may be disposed above the suction unit 120 to sense an obstacle, a geographic feature, and the like, in front of the robot cleaner 100 such that the suction unit 120 positioned on the forefront may not collide with the obstacle.

The sensing unit 130 is configured to additionally perform another sensing function in addition to such sensing (or detection) function. This will be described in detail hereinafter.

A dust box accommodation part 113 is provided in the cleaner main body 110, and a dust box 140 separately collecting dust in sucked air is detachably coupled to the dust box accommodation part 113. As illustrated, the dust box accommodation part 113 may be provided on the other side of the cleaner main body 110, i.e., on the rear of the cleaner main body 110.

A portion of the dust box 140 may be accommodated in the dust box accommodation part 113 while another portion of the dust box 140 may protrude toward a rear side (that is, a reverse direction (R) opposite to a forward direction (F)) of the cleaner main body 110.

An inlet 140a, to which air including dust is introduced, and an outlet 140b, from which air separated from dust is discharged, are provided in the dust box 140. When the dust box 140 is installed in the dust box accommodation part, the inlet 140a and the outlet 140b communicate with a first opening 110a and a second opening 110b provided on an inner side wall of the dust box accommodation part.

An intake flow channel inside the cleaner main body 110 corresponds to a flow channel from an inlet (not shown) communicating with a communication part 120b" to the first opening 110a, and an exhaust flow channel corresponds to a flow channel from the second opening 110b to an exhaust 112.

According to the connection relationship, air including dust introduced through the suction unit 120 is introduced to the dust box 140 through the intake flow channel within the cleaner main body 110 and air and dust are separated from each other through a filter or cyclone of the dust box 140. Dust is collected by the dust box 140 and air is discharged from the dust box 140, passes through an exhaust flow channel within the cleaner main body 110, and is finally discharged to the outside through the exhaust 112.

Figure 4:
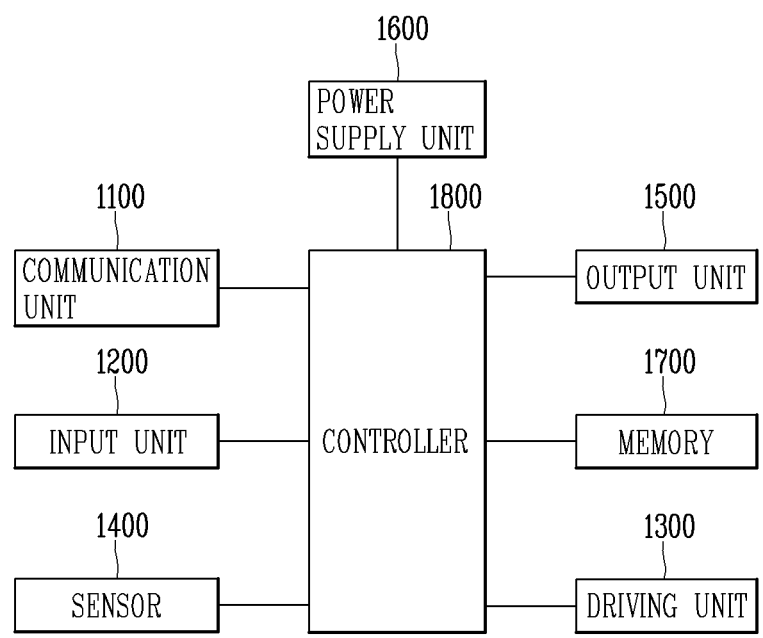
FIG. 4 is a block diagram illustrating components of a cleaner according to an embodiment of the present invention.

An embodiment related to components of the robot cleaner 100 is described in FIG. 4.

The robot cleaner 100 or the moving robot according to an embodiment of the present invention may include at least one of a communication unit 1100, an input unit 1200, a driving unit 1300, a sensing unit 1400, an output unit 1500, a power supply unit 1600, a memory 1700, and a controller 1800, and any combination thereof.

Here, the components illustrated in FIG. 4 are not essential and a robot cleaner including greater or fewer components may be implemented. Hereinafter, the components will be described.

First, the power supply unit 1600 includes a battery that may be charged by external commercial power and supplies power to the inside of the moving robot. The power supply unit 1600 may supply driving power to each of the components included in the moving robot to provide operation power required for the moving robot to travel (or move or run) or perform a specific function.

Here, the controller 1800 may detect a remaining capacity of power of the battery, and when the remaining capacity of power is insufficient, the controller 1800 controls the moving robot to move to a charging station connected to an external commercial power so that the battery may be charged upon receiving a charge current from the charging station. The battery may be connected to a battery sensing unit and a remaining battery capacity and a charging state thereof may be transmitted to the controller 1800. The output unit 1500 may display a remaining battery capacity on a screen by the controller 1800.

The battery may be positioned on a lower side of the center of the robot cleaner or may be positioned on one of left and right sides. In the latter case, the moving robot may further include a balance weight (or a counter weight) in order to resolve weight unbalance of the battery.

Meanwhile, the driving unit 1300 may include a motor and drive the motor to rotate left and right main wheels of the main body of the moving robot in both directions to rotate or move the main body. The driving unit 1300 may move the main body of the moving robot forwards/backwards and leftwards/rightwards, or enable the main body of the moving robot to travel in a curved manner or rotate in place.

Meanwhile, the input unit 1200 receives various control commands regarding the robot cleaner from a user. The input unit 1200 may include one or more buttons, for example, an OK button, a setting button, and the like. The OK button is a button for receiving a command for checking detection information, obstacle information, position information, and map information from the user, and the setting button may be a button for receiving a command for setting the aforementioned types of information from the user.

Also, the input unit 1200 may include an input resetting button for canceling a previous user input and receiving a user input again, a delete button for deleting a preset user input, a button for setting or changing an operation mode, or a button for receiving a command for returning to the charging station.

Also, the input unit 1200 may be installed in an upper portion of the moving robot, as a hard key, a soft key, or a touch pad. Also, the input unit 1200 may have a form of a touch screen together with the output unit 1500.

Meanwhile, the output unit 1500 may be installed in an upper portion of the moving robot. An installation position or an installation form thereof may be varied. For example, the output unit 1500 may display a battery state or a traveling scheme.

Also, the output unit 1500 may output information regarding a state of an interior of the moving robot detected by the sensing unit 1400, for example, a current state of each component included in the moving robot. Also, the output unit 1500 may display external state information, obstacle information, position information, and map information detected by the sensing unit 1400 on a screen. The output unit 1500 may be configured as at least one device among a light emitting diode (LED), a liquid crystal display (LCD), a plasma display panel (PDP), an organic light emitting diode (OLED).

The output unit 1500 may further include a sound output unit audibly outputting an operational process or an operation result of the moving robot performed by the controller 1800. For example, the output unit 1500 may output a warning sound outwardly according to a warning signal generated by the controller 1800.

Here, the sound output unit may be a unit for outputting a sound, such as a beeper, a speaker, and the like, and the output unit 1500 may output audio data or message data having a predetermined pattern stored in the memory 1700 through the sound output unit.

Thus, the moving robot according to an embodiment of the present invention may output environment information regarding a traveling region on a screen or output it as a sound through the output unit 1500. Also, according to another embodiment, the moving robot may transmit map information or environment information to a terminal device through the communication unit 1100 such that the terminal device may output a screen or a sound to be output through the output unit 1500.

Meanwhile, the communication unit 1100 may be connected to the terminal device and/or a different device positioned within a specific region (which will be used together with a "home appliance" in this disclosure) according to one communication scheme among wired, wireless, and satellite communication schemes to transmit and receive data.

The communication unit 1100 may transmit and receive data to and from a different device positioned within a specific region. Here, the different device may be any device as long as it may be connected to a network and transmit and receive data. For example, the different device may be a device such as an air-conditioner, a heating device, an air purifier, a lamp, a TV, an automobile, and the like. Also, the different device may be a device for controlling a door, a window, a plumbing valve, a gas valve, and the like. Also, the different device may be a sensor sensing a temperature, humidity, atmospheric pressure, a gas, and the like.

Meanwhile, the memory 1700 stores a control program controlling or driving the robot cleaner and data corresponding thereto. The memory 1700 may store audio information, image information, obstacle information, position information, map information, and the like. Also, the memory 1700 may store information related to a traveling pattern.

As the memory 1700, a non-volatile memory is commonly used. Here, the non-volatile memory (NVM) (or NVRAM) is a storage device capable of continuously maintaining stored information even though power is not applied thereto. For example, the memory 1700 may be a ROM, a flash memory, a magnetic computer storage device (for example, a hard disk or a magnetic tape), an optical disk drive, a magnetic RAM, a PRAM, and the like.

Meanwhile, the sensing unit 1400 may include at least one of an external signal sensor, a front sensor, a cliff sensor, a lower camera sensor, and an upper camera sensor.

The external signal sensor may sense an external signal of the moving robot. The external signal sensor may be, for example, an infrared sensor, an ultrasonic sensor, an RF sensor, and the like.

The moving robot may check a position and a direction of the charging station upon receiving a guide signal generated by the charging station using the external signal sensor. Here, the charging station may transmit the guide signal indicating a direction and a distance such that the moving robot may be returned. That is, upon receiving the signal transmitted from the charging station, the moving robot may determine a current position and set a movement direction to return to the charging station.

Meanwhile, the front sensor may be installed at a predetermined interval on a front side of the moving robot, specifically, along an outer circumferential surface of a side surface of the moving robot. The front sensor may be positioned on at least one side surface of the moving robot to sense an obstacle ahead. The front sensor may sense an object, in particular, an obstacle, present in a movement direction of the moving robot and transfer detection information to the controller 1800. That is, the front sensor may sense a protrusion present in a movement path of the moving robot, furnishings, furniture, a wall surface, a wall corner, and the like, in a house, and transmit corresponding information to the controller 180.

The front sensor may be, for example, an infrared sensor, an ultrasonic sensor, an RF sensor, a geomagnetic sensor, and the like, and the moving robot may use one kind of sensor or two or more kinds of sensors together as the front sensor.

For example, in general, the ultrasonic sensor may be mainly used to sense an obstacle in a remote area. The ultrasonic sensor may include a transmission unit and a reception unit. The controller 1800 may determine whether an obstacle is present according to whether an ultrasonic wave radiated through the transmission unit is reflected by an obstacle, or the like, and received by the reception unit, and calculate a distance to the obstacle by using an ultrasonic wave radiation time and an ultrasonic wave reception time.

Also, the controller 1800 may detect information related to a size of an obstacle by comparing an ultrasonic wave radiated from the transmission unit and an ultrasonic wave received by the reception unit. For example, as a larger amount of ultrasonic waves is received by the reception unit, the controller 1800 may determine that the size of the obstacle is larger.

In one embodiment, a plurality of ultrasonic sensors (for example, five ultrasonic sensors) may be installed on an outer circumferential surface of a front side of the moving robot. Here, preferably, the transmission units and the reception units of the ultrasonic sensors may be installed alternately on the front side of the moving robot.

That is, the transmission units may be disposed to be spaced apart from the center of the front side of the main body of the moving robot, and in this case, one or two or more transmission units may be disposed between reception units to form a reception region of an ultrasonic signal reflected from the obstacle, or the like. Due to this disposition, a reception region may be expanded, while reducing the number of sensors. A transmission angle of ultrasonic waves may be maintained at an angle of a range which does not affect other signals to prevent a crosstalk phenomenon. Also, reception sensitivity of the reception units may be set to be different.

Also, the ultrasonic sensors may be installed upwardly at a predetermined angle such that ultrasonic waves generated by the ultrasonic sensors are output upwardly, and in this case, in order to prevent the ultrasonic waves from being radiated downwardly, a predetermined blocking member may be further provided.

Meanwhile, as mentioned above, two or more kinds of sensors may be used as the front sensors, and thus, any one kind of sensors among an infrared sensor, an ultrasonic sensor, and an RF sensor may be used as the front sensors.

For example, the front sensor may include an infrared sensor as another kind of sensor, in addition to the ultrasonic sensor.

The infrared sensor may be installed on an outer circumferential surface of the moving robot together with the ultrasonic sensor. The infrared sensor may also sense an obstacle present in front of or by the side of the moving robot and transmit corresponding obstacle information to the controller 1800. That is, the infrared sensor may sense a protrusion present in a movement path of the moving robot, furnishings, furniture, a wall surface, a wall corner, and the like, in a house, and transmit corresponding information to the controller 1800. Thus, the moving robot may move within a cleaning area without colliding with an obstacle.

Meanwhile, as the cliff sensor, various types of optical sensors may be used, and the cliff sensor may sense an obstacle on the floor supporting the main body of the moving robot.

That is, the cliff sensor may be installed on a rear surface of the moving robot 100 and may be installed in different regions depending on a kind of a moving robot. The cliff sensor may be positioned on a rear surface of the moving robot to sense an obstacle on the floor. The cliff sensor may be an infrared sensor including a light emitting unit and a light receiving unit, an ultrasonic sensor, an RF signal, a position sensitive detector (PSD) sensor, and the like, like the obstacle sensor.

For example, any one of cliff sensors may be installed on the front side of the moving robot, and the other two cliff sensors may be installed on a relatively rear side.

For example, the cliff sensor may be a PSD sensor or may include a plurality of different kinds of sensor.

The PSD sensor detects the positions of the short and long distances of an incident light with a single p-n junction by using the surface resistance of a semiconductor. The PSD sensor includes a 1D PSD sensor that detects light on a single axis and a 2D PSD sensor that may detect the position of light on the surface, and they have a pin photodiode structure. The PSD sensor is a type of infrared sensor which transmits an infrared ray to an obstacle and measures an angle between the infrared ray transmitted to the obstacle an infrared ray returned after being reflected from the obstacle, thus measuring a distance therebetween. That is, the PSD sensor calculates a distance to the obstacle using triangulation.

The PSD sensor includes a light emitting unit emitting infrared light to an obstacle and a light receiving unit receiving infrared light returned after being reflected from the obstacle. In general, the PSD sensor is formed as a module. If an obstacle is sensed by using the PSD sensor, a stable measurement value may be obtained regardless of difference in reflectivity or color of the obstacle.

The controller 1800 may measure an angle between an infrared light emitting signal irradiated by the cliff sensor toward the floor and a reflection signal received after being reflected from the obstacle to sense a cliff, and analyze a depth thereof.

Meanwhile, the controller 1800 may determine whether the moving robot may be able to pass through a cliff according to a floor state of the cliff sensed by using the cliff sensor. For example, the controller 1800 may determine whether a cliff is present and a depth of the cliff through the cliff sensor and only when a reflection signal is sensed by the cliff sensor, the controller 1800 allows the moving robot to pass through the cliff.

In another example, the controller 1800 may determine whether the moving robot is lifted using the cliff sensor.

Meanwhile, the lower camera sensor may be provided on a rear surface of the moving robot and obtain image information related to the lower side, i.e., the floor (or a cleaning target surface) during movement. The lower camera sensor is also called an optical flow sensor. The lower camera sensor may convert an image of the lower side input from an image sensor provided therein to generate a predetermined format of image data. The generated image data may be stored in the memory 1700.

Also, one or more light sources may be installed to be adjacent to the image sensor. One or more light sources irradiate light to a predetermined region of the floor captured by the image sensor. Namely, if the moving robot moves a cleaning region along the floor, when the floor is smooth, a predetermined distance is maintained between the image sensor and the floor. On the other hand, if the moving robot moves on the floor which is uneven, the image sensor may become away from the floor by a predetermined distance or greater due to depressions and protrusions and an obstacle of the floor. In this case, the one or more light sources may be controlled by the controller 1800 such that an amount of irradiated light may be adjusted. The light sources may be a light emitting device, for example, a light emitting diode (LED), or the like, whose amount of light may be adjusted.

The controller 1800 may detect a position of the moving robot regardless of whether the moving robot slides by using the lower camera sensor. The controller 1800 may compare and analyze image data captured by the lower camera sensor over time to calculate a movement distance and a movement direction, and calculate a position of the moving robot on the basis of the calculated movement distance and the calculated movement direction. By using the image information regarding the lower side of the moving robot using the lower camera sensor, the controller 1800 may perform correction resistant to sliding with respect to a position of the moving robot calculated by other means.

Meanwhile, the upper camera sensor may be installed to face an upper side or a front side of the moving robot to image surroundings of the moving robot. When the moving robot includes a plurality of upper camera sensors, the camera sensors may be formed on the upper portion or side surface of the moving robot at a certain distance or at a certain angle.

Figure 5:
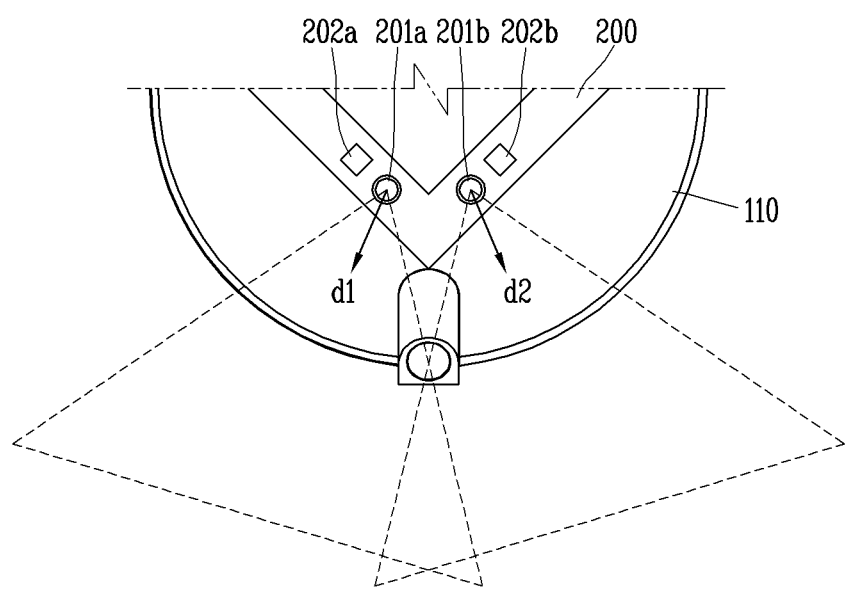
FIG. 5 is a conceptual diagram illustrating a sensing module included in a cleaner according to an exemplary embodiment of the present invention to generate three-dimensional coordinate information.

In FIG. 5, a sensing module 200 provided in a cleaner according to an embodiment of the present invention to generate three-dimensional coordinate information is illustrated.

As shown in FIG. 5, the cleaner 100 according to the present invention may include a first camera 201a and a second camera 201b for photographing the periphery of the main body.

Referring to FIG. 5, first and second cameras 201a and 201b may be directed in different directions. In one example, a direction in which the first camera is directed may be defined as a direction in which one point of a lens of the first camera faces. In another example, the direction in which the first camera is directed may be defined as a direction in which an optical axis of the lens of the first camera is directed.

In addition, the direction in which the first camera 201a is directed and the direction in which the second camera 201b is directed may form a predetermined angle. In one example, the predetermined angle may be 90° or an acute angle.

Referring to FIG. 5, the first camera 201a may be directed to the right with respect to a front direction of the main body, and the second camera 201b may be directed to the left with respect to the front direction of the main body.

In one example, the first and second cameras 201a and 201b may be RGBD (Red, Green, Blue, Distance) cameras. In another example, the first and second cameras 201a and 201b may be depth cameras.

Meanwhile, the cleaner 100 may include infrared projectors 202a and 202b that emit infrared rays. The infrared projectors may include a first beam 202a and a second beam 202b, respectively.

Specifically, a direction in which the first beam 202a is directed may correspond to the direction in which the first camera 201a is directed. Similarly, a direction in which the second beam 202b is directed may correspond to the direction in which the second camera 201b is directed.

Although not shown in FIG. 5, the infrared projectors may be formed of one module that emits infrared rays in all directions.

The controller 1800 may control the first and second cameras so that the first and second cameras 201a and 201b capture images in accordance with predetermined order.

In one embodiment, the controller 1800 may control the first and second cameras such that the first and second cameras 201a and 201b are alternately driven. That is, the controller 1800 may toggle on/off states of the first and second cameras 201a and 201b. Thus, the first and second cameras 201a and 201b may be turned on at different times alternately without being turned on at the same time.

In another embodiment, the controller 1800 may control the on-time of the first and second cameras so that the first and second cameras 201a and 201b alternately capture images. In one example, the controller 1800 may turn on the other one before any one of the first and second cameras 201a and 201b is turned off. That is, the controller 1800 may turn on the first and second cameras 201a and 201b at different points of time and drive the first and second cameras 201a and 201b so that a driving time of the first camera and a driving time of the second camera partially overlap each other.

The controller 1800 may generate three-dimensional (3D) coordinate information related to the surroundings of the main body of the cleaner 100 by using images alternately obtained by the first and second cameras 201a and 201b alternately.

In addition, the controller 1800 may change the outputs of the infrared projectors 202a and 202b. In particular, the controller 1800 may increase the outputs of the infrared projectors 202a and 202b to increase a target distance of the first and second cameras 201a and 201b.

Since the first camera 201a is paired with the first beam 202a and the second camera 201b is paired with the second beam 202b as shown in FIG. 5, the controller 1800 may adjust the output of the first beam when the first camera is in an ON state and adjust the output of the second beam when the second camera is in an ON state.

In one embodiment, the controller 1800 may repeatedly change the output values of the infrared projectors 202a and 202b to a first value and a second value. At this time, the second value may be set to a value higher than the first value.

In addition, the infrared projectors 202a and 202b may emit infrared signals of a predetermined pattern. In one example, the first beam 202a and the second beam 202b may emit infrared signals of the same pattern, respectively, or may emit infrared signals of different patterns.

Figure 6:
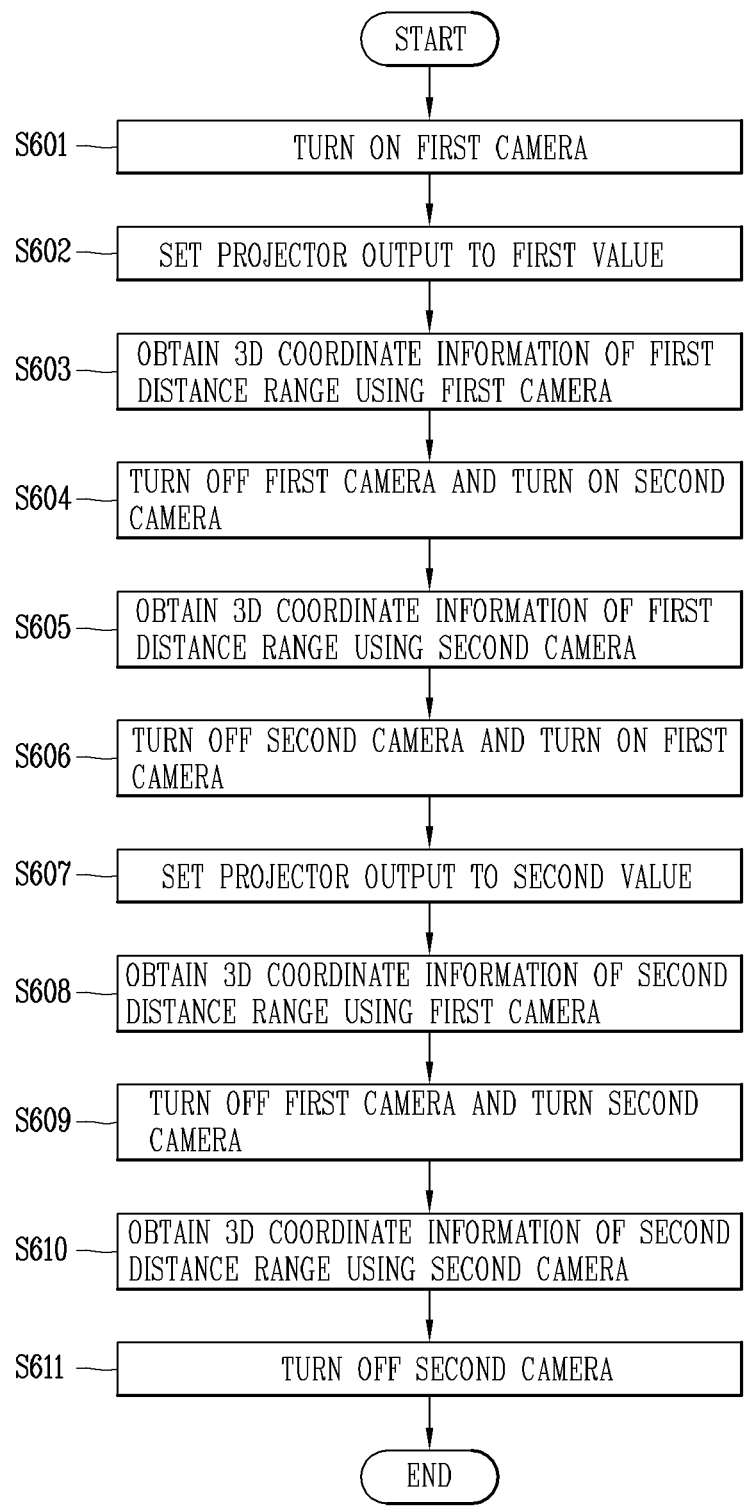
FIG. 6 is a flowchart illustrating a controlling method of a cleaner according to an embodiment of the present invention.

In FIG. 6, processes performed by the controller 1800 of the cleaner 100 according to the present invention are described in sequence.

The controller 1800 may perform a first step (S601) of turning on the first camera 201a.

The controller 1800 may perform a second step (S602) of setting the output of the infrared projectors 202a and 202b to the first value. In particular, the controller 1800 may set the output of the first beam 202a to the first value when the first camera is turned on.

The controller 1800 may perform a third step (S603) of acquiring information related to an object existing within a first distance range from the main body using the first camera. Here, the first distance range may be set based on an output value of the infrared projector. That is, assuming that the first value is a relatively small output value, the first camera may capture an image related to an object located near the periphery of the main body.

The controller 1800 may perform a fourth step of turning off the first camera and a fifth step (S604) of turning on the second camera after the first camera is turned off.

Thereafter, the controller 1800 may perform a sixth step (S605) of acquiring information related to an object existing within the first distance range from the main body using the second camera. When the third step (S603) and the sixth step (S605) are compared, the controller 1800 may obtain different 3D coordinate information in the third step and the sixth step according to a difference between a viewing angle of the first camera and a viewing angle of the second camera.

That is, by turning on the first camera during a first period in a state that the output of the infrared projector is the first value, the controller 1800 may obtain 3D coordinate information related to an object included in the viewing angle of the first camera and existing within the first distance range from the main body.

Further, by turning on the first camera during the first period in a state that the output of the infrared projector is the first value, the controller 1800 may obtain 3D coordinate information related to the object included in the viewing angle of the first camera and existing within the first distance range from the main body. In addition, in the state that the output of the infrared projector is the first value, after the first period has lapsed, the controller 1800 may turn on the second camera during a second period to obtain 3D coordinate information related to the object included in the viewing angle of the second camera and existing within the first distance range from the main body. Here, the first and second periods may be changed.

The controller 1800 may perform a seventh step of turning off the second camera and an eighth step (S606) of turning on the first camera again.

The controller 1800 may perform a ninth step (S607) of setting the output of the infrared projector to a second value higher than the first value.

The controller 1800 may perform a tenth step (S608) of obtaining information related to an object existing within a second distance range, out of the first distance range, from the main body using the first camera. That is, the second distance range may correspond to an area farther from the main body than the first distance range.

Here, the second distance range may be set based on an output value of the infrared projector. That is, assuming that the second value is a relatively large output value, the first camera may take an image related to an object located far away from the main body. For example, when the output value of the infrared projector is a second value, the controller 1800 may obtain 3D coordinate information related to a wall of a cleaning area located in a direction that the first camera is directed.

The controller 1800 may perform an eleventh step of turning off the first camera and a twelfth step (S609) of turning on the second camera.

The controller 1800 may perform a thirteenth step (S610) of obtaining information related to an object existing within the second distance range from the main body using the second camera.

Thereafter, the controller 1800 may perform a fourteenth step (S611) of turning off the second camera.

When the tenth step (S608) and the thirteenth step (S610) are compared, the controller 1800 may obtain different 3D coordinate information in the tenth step and the thirteenth step due to the difference between the viewing angle of the first camera and the viewing angle of the second camera.

That is, by turning on the first camera during a third period in a state that the output of the infrared projector is the second value, the controller 1800 may obtain 3D coordinate information related to the object included in the viewing angle of a fourth camera and existing within the first distance range from the main body.

Further, by turning on the first camera during the third period in a state that the output of the infrared projector is the second value, the controller 1800 may obtain 3D coordinate information related to the object included in the viewing angle of the first camera and existing within the second distance range from the main body. In addition, in the state that the output of the infrared projector is the second value, after the third period has lapsed, the controller 1800 may turn on the second camera during a fourth period to obtain 3D coordinate information related to the object included in the viewing angle of the second camera and existing within the second distance range from the main body. Here, the third and fourth periods may be changed.

When the first to fourth periods are compared, the first and second periods are periods for obtaining short range information and the third and fourth periods are periods for obtaining remote information. In addition, the first and third periods are periods for obtaining information related to the direction in which the first camera is directed, and the second and fourth periods are periods for obtaining information related to the direction in which the second camera is directed.

Accordingly, the controller 1800 may set or change the first to fourth periods, respectively, according to a driving state of the cleaner 100.

For example, while the cleaner 100 is moving to the left or turning to the left, the controller 1800 may set the second and fourth periods to be longer than the first and third periods in order to obtain more information related to the object located on the left side based on the main body of the cleaner 100.

In another example, while the cleaner 100 is performing obstacle avoidance traveling, the controller 1800 may set the first and second periods to be longer than the third and fourth periods in order to obtain more information related to an object located close to the cleaner 100.

When the output value of the infrared projector is the first value, the controller 1800 may detect information related to an obstacle existing around the main body using the information obtained by the first and second cameras.

Specifically, the information related to the obstacle existing around the main body may include information related to at least one of a distance between the main body and the obstacle, the coordinates of the obstacle, and a size of the obstacle.

When the output value of the infrared projector is the second value larger than the first value, the controller 1800 may detect information related to a position of the main body using the information obtained by the first and second cameras.

Specifically, the information related to the position of the main body may include at least one of map information corresponding to the cleaning area, absolute position information of the main body, and relative position information of the main body.

Meanwhile, the controller 1800 may sequentially repeat the steps S601 to S611 or the first to fourteenth steps shown in FIG. 6.

Figure 7:
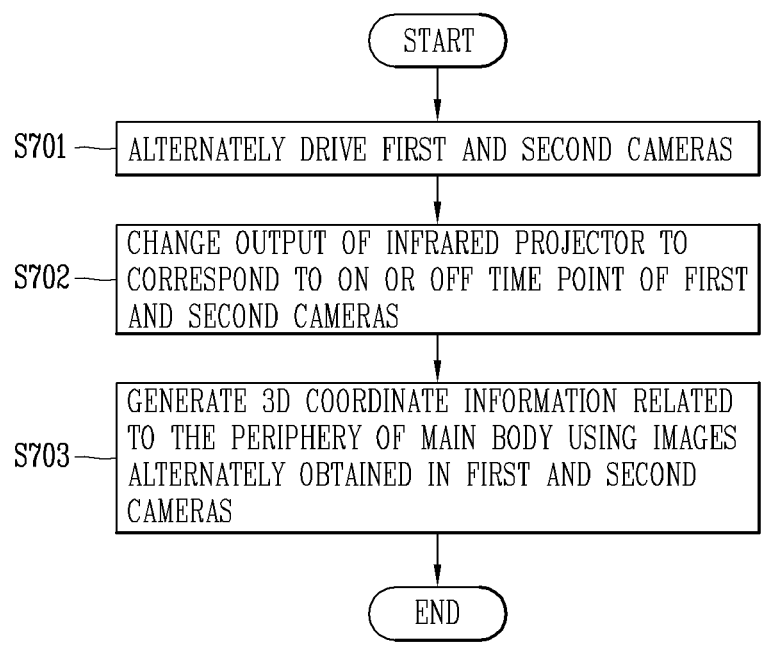
FIG. 7 is a flowchart illustrating a controlling method of a cleaner according to an embodiment of the present invention.

In another embodiment, referring to FIG. 7, the controller 1800 may alternately drive the first and second cameras (S701).

The controller 1800 may change the output of the infrared projector according to ON or OFF time points of the first and second cameras (S702).

The controller 1800 may generate 3D coordinate information related to the periphery of the main body using images alternately obtained from the first and second cameras (S703).

Specifically, the step of alternately driving the first and second cameras may include a short-distance photographing step of alternately driving the first and second cameras in a state that the output of the infrared projector is set to a first value and a long-distance photographing step of alternately driving the first and second cameras in a state that the output of the projector is set to a second value larger than the first value.

In one example, the short-distance photographing step and the long-distance photographing step may be sequentially and repeatedly performed.

According to the present invention, it is possible to replace other sensors required for obstacle detection or position recognition by using only one sensor module for acquiring three-dimensional coordinate information related to an object around the main body.

Further, according to the present invention, obstacle detection and position recognition can be accurately performed even in a dark environment by using two depth cameras and adjusting an output of an infrared projector.

In addition, according to the present invention, since the cleaner which performs autonomous traveling can quickly process three-dimensional coordinate information while maintaining performance of the controller, it is possible to prevent an increase in manufacturing cost.

The foregoing embodiments and advantages are merely exemplary and are not to be considered as limiting the present invention. The present teachings may be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A cleaner performing autonomous traveling, the cleaner comprising:
   a main body;
   first and second cameras photographing the periphery of the main body;
   a controller controlling the first and second cameras to capture an image according to preset order;
   a first infrared projector paired with the first camera such that the controller adjusts the output value of the first infrared projector when the first camera is in an ON state; and
   a second infrared projector paired with the second camera such that the controller adjusts the output value of the second infrared projector when the second camera is in an ON state, wherein:
a direction in which the first camera is directed and a direction in which the second camera is directed form a predetermined angle,
the controller generates three-dimensional (3D) coordinate information related to an object located near the main body using images obtained in the first and second cameras,
the controller repeatedly increases and decreases the output value of the first and second infrared projectors to a first value and a second value in order to change a target distance of the first and second cameras, and the second value is set to a value higher than the first value,
the controller turns on the first and second cameras at different points of time and drives the first and second cameras so that a driving time of the first camera and a driving time of the second camera partially overlap each other, and
the controller controls the driving time of the first camera and the driving time of the second camera based on a moving direction of the cleaner.

2. The cleaner of claim 1, wherein the first and second infrared projectors emit infrared signals of predetermined different patterns.

3. The cleaner of claim 1, wherein the camera performs:
a first step of turning on the first camera,
a second step of setting the output of the first and second infrared projectors to the first value,
a third step of obtaining information related to an object existing within a first distance range from the main body by using the first camera, and
a fourth step of turning off the first camera.

4. The cleaner of claim 3, wherein the controller performs:
a fifth step of turning on the second camera when the first camera is being turned off in the fourth step,
a sixth step of obtaining information related to the object existing within the first distance range from the main body by using the second camera, and
a seventh step of turning off the second camera.

5. The cleaner of claim 4, wherein the controller performs:
an eighth step of turning on the first camera,
a ninth step of setting the output of the first and second infrared projectors to a second value higher than the first value,
a tenth step of obtaining information related to an object existing within a second distance range, out of the first distance range, from the main body using the first camera, and
an eleventh step of turning off the first camera.

6. The cleaner of claim 5, wherein the controller performs:
a twelfth step of turning on the second camera when the first camera is being turned off in the eleventh step,
a thirteenth step of obtaining information related to an object existing within the second distance range from the main body using the second camera, and
a fourteenth step of turning off the second camera.

7. The cleaner of claim 6, wherein the controller sequentially and repeatedly performs the first to fourteenth steps.

8. The cleaner of claim 1, wherein when the output value of the first and second infrared projectors is the first value, the controller detects information related to an obstacle existing around the main body by using the information obtained by the first and second cameras.

9. The cleaner of claim 1, wherein when the output value of the first and second infrared projectors is the second value greater than the first value, the controller detects information related to a position of the main body by using the information obtained by the first and second cameras.

10. The cleaner of claim 1, wherein the first and second cameras are red, green, blue, distance (RGBD) cameras.

11. The cleaner of claim 1, wherein the first and second cameras are depth cameras.

12. The cleaner of claim 1, wherein a direction of a beam emitted from the first infrared projector corresponds to a direction in which the first camera is directed, and a direction of a beam emitted from the second infrared projector corresponds to a direction in which the second camera is directed.

* * * * *